Figure 4A:
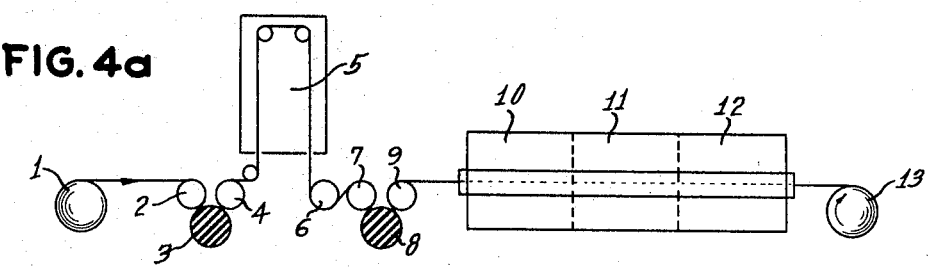

June 6, 1967  H. GEBLER ET AL  3,324,218
PROCESS FOR THE MANUFACTURE OF POLYPROPYLENE FILMS
Filed Sept. 25, 1964  2 Sheets-Sheet 1
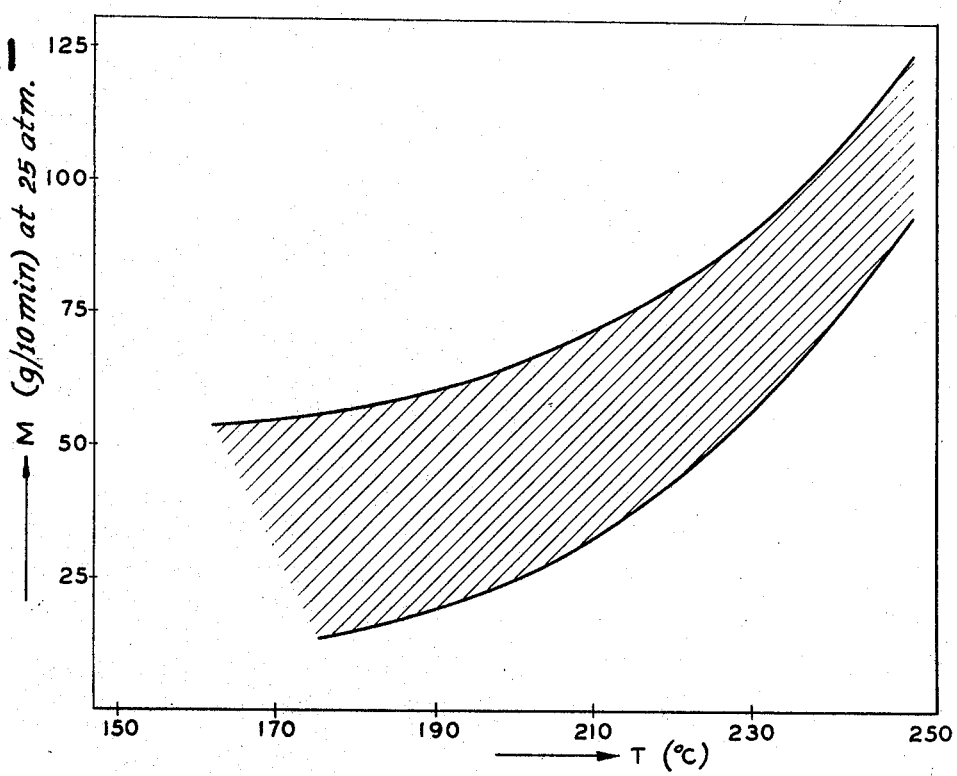
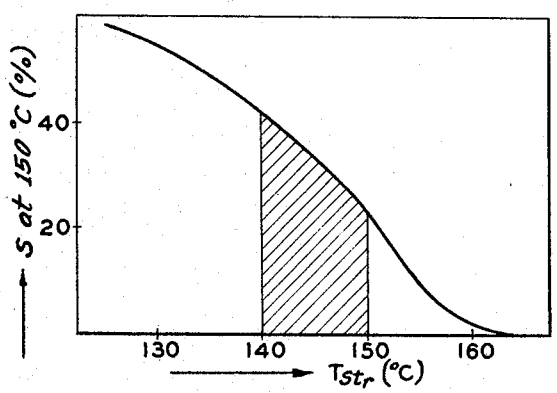
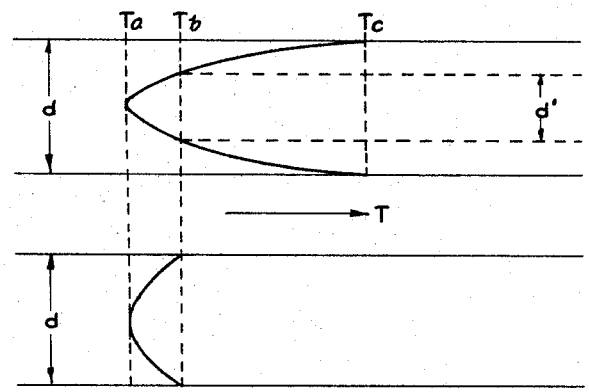
INVENTORS
Walter Seifried
Horst Gebler
BY
James E. Bryan
ATTORNEY

United States Patent Office 3,324,218
Patented June 6, 1967

3,324,218
PROCESS FOR THE MANUFACTURE OF POLYPROPYLENE FILMS
Horst Gebler, Wiesbaden, and Walter Seifried, Wiesbaden-Biebrich, Germany, assignors to Kalle Aktiengesellschaft, Wiesbaden-Biebrich, Germany, a corporation of Germany
Filed Sept. 25, 1964, Ser. No. 399,239
Claims priority, application Germany, Sept. 28, 1963, K 50,950
6 Claims. (Cl. 264—210)

This invention relates to a process for the manufacture of polypropylene films.

It is known to wrap goods in transparent materials by enveloping the article to be wrapped in a clear film and closing the package by cementing or sealing. The known methods are especially suitable for articles having rectangular sides.

Modern marketing trends make it desirable also to wrap goods of irregular shape in a manner which appeals to the eye. One means of achieving this is by the use of shrinkable films, i.e., films whose molecular structure is orientated by stretching in the plane of the film and stabilized in this state by cooling under tension. When such a film is heated to a certain elevated temperature without applying external tension, the film tends to return to its original, unorientated state by shrinking, i.e., its dimensions are reduced by a certain value.

The term "shrinkage" as used herein signifies in all cases the decrease in length in one direction in the plane of the film, in percent. Of special industrial value is a shrinkage capacity of more than 30% in all directions in the plane of the film.

When shrinkable films are used for wrapping, the goods to be wrapped are loosely enveloped in a shrinkable film, which latter, if desired, is then closed by a known sealing operation. The film is then heated to a predetermined elevated temperature which causes it to shrink and become tautly and closely enveloped about the article.

Shrinkable films used in the past have included stretched films of isotactic polypropylene, which are of special value for wrapping foodstuffs of all kinds, chiefly because they are inexpensive and physiologically unobjectionable.

The biaxial stretching of films of isotactic polypropylene is known in principle. Conventionally, isotactic polypropylene is extruded at a temperature ranging from 190 to 325° C. and the melt is quenched to a temperature below 90° C. The subsequent biaxial stretching of the film is performed either simultaneously or in two successive operations in the longitudinal and transverse directions. Stretching is performed at a temperature ranging from the crystallite melting point of polypropylene to a temperature as much as 60° C. below such melting point. In this manner, a linear stretch ratio of up to 15 can be achieved.

The present invention provides a process for the manufacture of shrinkable polypropylene films by extrusion of predominantly isotactic polypropylene, at a temperature ranging from 190 to 325° C., through a sheet die and quenching the extruded melt to a temperature below 90° C., the sheet die having such a width as to give the resulting film a thickness greater than 0.3 mm. The film is then heated to a temperature between the crystallite melting point of polypropylene and a temperature as much as 60° C. below such melting point, stretched at a linear stretch ratio of up to 15 in two directions perpendicular to each other, and cooled under tension.

In the present process, the film (a) is preheated for longitudinal stretching to a temperature ranging from $(T_1-5°C.)$ to $T_1$ $(T_1=130°$ to $140°$ C.$)$, (b) further heated in contact with a roll maintained at a temperature $T_2$ $(T_2=140°$ to $150°$ C.$)$,
(c) stretched to 5 to 7 times its original length,
(d) immediately cooled by contact with a cool roll,
(e) heated to a temperature from $(T_3-5°$ C.$)$ to $T_3$ $(T_3=155$ to $165°$ C.$)$, and
(f) stretched to 8 to 13 times its width at a temperature of $T_4$ $(T_4=150°$ to $160°$ C.$)$, where $T_1<T_2<T_4<T_3$.
$T_1$ is advanatageously within the range from 135° to 137° C., $T_2$ is advantageously from 145° to 147° C., $T_3$ advantageously from 158 to 162° C. and $T_4$ advantageously ranges from 156° to 160° C.

The polypropylene employed in the present process is a predominantly isotactic polypropylene whose specific gravity $\rho_{20}$ is advantageously within the range from 0.90 to 0.91 grams per ml. and in many cases is 0.906 g./ml. Furthermore, it has advantageously an RSV value greater than 2, preferably from 3 to 4. The RSV value is the reduced viscosity $\eta_{red}=\eta_{spec}/c$, where $\eta_{red}$ is the reduced viscosity, $\eta_{spec}$ the specific viscosity and $c$ the concentration. As is known, the RSV value is determined at 135° C. in a 0.1% solution of the polymer in cis-decahydronaphthalene stabilized with 0.5% of phenyl-$\beta$-naphthylamine. The melt index $i_5$ of the polypropylene used (measured according to ASTM D 1238-57 T at 230° C.) is advantageously 3 to 15 g./10 mins. It is of advantage to use a polypropylene whose melt displays a viscoelastic behavior that is only slightly affected by temperature. In this connection, it is desirable that the melt index M, measured by a commercial CIL (Canadian Industries Ltd) tester at 25 atmospheres pressure, as a function of temperature T should fall within the crosshatched band in the graphical representation shown in FIGURE 1 of the accompanying drawings.

The present process for the manufacture of films of isotactic polypropylene employs stretching in the longitudinal and then in the transverse direction. This sequence of operations is easier to carry out on an industrial scale for various reasons. Owing to the high transverse stretching ratio of polypropylene required for a desired final width of the film, the width of the installation used for longitudinal stretching can be very much reduced if this operation is conducted first. Moreover, before transverse stretching of the film, it can be longitudinally stretched with a much smaller contraction in the transverse direction, since in this case no transverse shrinkage forces are exerted at the stretching temperature. The reverse order of the stretching operations, first in the transverse and then in the longitudinal direction, is also unfavorable because the edge of the film, whose thickness has increased by the amount of the transverse stretching ratio, must be heated for a correspondingly longer time.

It has been found that in order to produce a polypropylene film suitable for shrink-wrapping according to this invention, the polypropylene of the unstretched film should have a minimum crystallinity of about 50% to produce a readily shrinkable lattice made up of amorphous and crystalline areas. Such a high crystallinity can be achieved only at a temperature below 150° C. This has been confirmed by measuring the shrinkage of a polypropylene film, stretched only monoaxially at a stretch ratio of 6, as a function of the stretching temperature. In the graphical representation of FIGURE 2 of the accompanying drawings is shown the shrinkage S in percent at a stretching temperature $T_{Str}$. The graph shows that the shrinkage behavior of the film with stretching temperatures above 150° C. is insufficient and that shrinkage improves as the stretching temperature is lowered. It further has been found that the stretching temperature for the first stretching operation of a biaxial stretching process also has a lower limit. At a temperature below 140° C., the streched film becomes turbid and so high an orientation of the molecules occurs that the film tends to split when it is stretched in the transverse direction. Subsequent transverse stretching is rendered difficult or even impossible. According to the present invention, longitudinal stretching is performed within a narrow temperature range of 140° to 150° C., preferably of 145° to 147° C., in order to achieve the high shrinkage capacity required for shrink-wrapping.

Longitudinal stretching in the known processes is carried out with infra-red heating, the surface temperature of the heater always being well above the desired stretching temperature. A polypropylene film of thickness $d$ heated in this manner from above and below is thus given a temperature gradient over its thickness as shown at the top of FIGURE 3 of the accompanying drawings. The film is heated to a temperature between $T_a$ and $T_c$. According to the present invention, however, the temperature suitable for producing a good shrinkage behavior of the stretched film should be between only $T_a$ and $T_b$, where $T_a$ and $T_b$ are between 140° and 150° C. Accordingly, when an infra-red heater is used, only the portion $d'$ of the total thickness $d$ of the film is stretched at the temperature which is advantageous for producing the required properties and this is generally true for stretching operations performed at a high surface temperature. Thus, optimum shrinkage properties of the film can not be achieved using radiant heaters. Also a polypropylene film longitudinally stretched using radiant heat is less clear than a film manufactured by the present process and, in contradistinction to the latter, tends to "string."

The longitudinal stretching according to the present invention ensures that the film is being stretched within an appropriately narrow temperature range. The system used includes a preheating zone, a stretching zone and a cooling zone.

In the preheating zone, the polypropylene film to be stretched is heated to a temperature from $(T_2-5°$ C.) to $T_1$, by impinging a high speed jet of air thereon, or by contact with heated rolls, or in a liquid bath. A temperature compensation sufficient for an optimum shrinkage behavior occurs when the quotient of the length of the air heating zone $s$ and the product of film speed $v$ and film thickness $d$ does not fall below a minimum value. This minimum value for $s/v.d$ is, in general, at least 0.5 when $s$ is expressed in meters, $v$ in meters per minute and $d$ in millimeters.

The film tension in the preheating zone of the longitudinal stretching system is necessarily approximately equal to the tension in the stretching zone. Therefore, the temperature $T_1$ must be below the surface temperature $T_2$ of the roll, since otherwise the stretching would not occur only within the stretching zone and would extend back into the preheating zone. For the manufacture of readily shrinkable films, the difference between $T_1$ and $T_2$ should be about 10° C.

The film heated to a temperature from $(T_1-5°$ C.) to $T_1$ leaves the preheating zone with a crystallinity increased to about 59%, is further heated in contact with a roll for a time which is relatively short compared with the preheating time and is then longitudinally stretched in the stretching zone at a local stretching speed of over $10^6$ percent per minute. During the longitudinal stretching, neither cooling nor heating agents are employed. The film is then rapidly cooled to about 20° C. in the cooling zone. The film stretched in the longitudinal stretching system of the invention is extremely clear. It has a crystallinity of about 58%, practically no "stringing" tendency, and possesses the desired optimum shrinkage capacity.

With the previously known processes, undesirable thickness variations occur during the transverse stretching. According to the present invention, a suitable temperature distribution provides a remedy and enables the manufacture of biaxially stretched film having a uniform thickness. This result is achieved by a negative temperature gradient in the stretching direction. The longitudinally stretched polypropylene film is heated during an appropriate time of traverse of the preheating zone, to a temperature $(T_3-5°$ C.) to $T_3$, $T_3$ being 155° to 165° C. The temperature $T_4$ of the film in the stretching zone is then maintained at 150° to 160° C., $T_4$ advantageously being about 5° below $T_3$. After the stretching operation, the biaxially stretched film is cooled under tension to a temperature below 40° C.

The process of the present invention provides a biaxially stretched, very clear polypropylene film which has a high crystallinity, for example about 55% and a thickness uniformity of better than ±10%. The film, in all directions in the film plane, satisfies the requirements of films for shrink-wrapping. The shrinkage capacity of films manufactured according to the present process is substantially greater than 35%, in all directions.

Figure 4B:
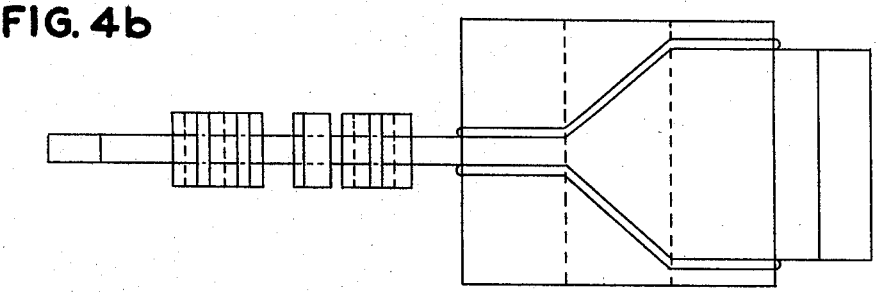
Figure 4C:
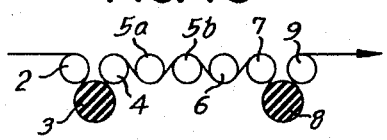

FIGURES 4a, 4b and 4c of the accompanying drawings illustrate digrammatically one embodiment of a machine suitable for performing the present process, FIGURE 4a being a view in elevation, FIGURE 4b being a plan view, and FIGURE 4c being a view in elevation of a roll assembly which can be employed alternatively to that shown in FIGURE 4a.

Referring to FIGURES 4a, 4b and 4c, a polypropylene film 1 to be biaxially stretched is introduced into a three-roll feed of a longitudinal stretching system, which feed consists of two steel rolls 2 and 4 driven at a speed $v_1$ and of a rubber roll 3 around which the film is looped and which is pressed against the steel rolls. The film then travels through a preheating zone 5 in which it is heated to the temperature $(T_1-5°$ C.) to $T_1$ by a high speed jet of air. For a given speed $v_1$ and a given film thickness $d$, the length of the preheating zone $s$ is advantageously such that the quotient $s/v_1.d$ attains the aforementioned necessary minimum value. Alternatively, the preheating may be carried out by contact with an adequate number of rolls, as in FIGURE 4c, in which rolls 5a and 5b are heated to temperature $T_1$. By contact with a roll 6, whose surface temperature is $T_2$, the film is further heated. Compared with $v_1$ the speed of the roll 6 is higher by the differential amount required to keep the film in the preheating zone nearly under stretching tension. The following cooled steel rolls 7 and 9 are driven at a speed $v_2$. Between these two rolls the film is looped around a rubber roll 8 which is pressed against them. The longitudinal stretch ratio results from the speed quotient $v_2/v_1=\lambda_1$. The narrow gap between the rolls 6 and 7 is the stretching zone. For transverse stretching, the longitudinally stretched polypropylene film is fed into a combination frame where it is moved along by holding means gripping the edges thereof. In a first zone of the frame 10 the film is heated to the temperature $(T_3-5°$ C.) to $T_3$. In a second zone 11 it is stretched in the transverse direction, and simultaneously the temperature of the film drops, due to the lower ambient temperature $T_4$. In the third zone 12, the film is cooled under tension to a temperature below 40° C. The biaxially stretched, shrinkable polypropylene film is reeled up on the reel 13.

The following example further illustrates the invention:

EXAMPLE

Figure 5:
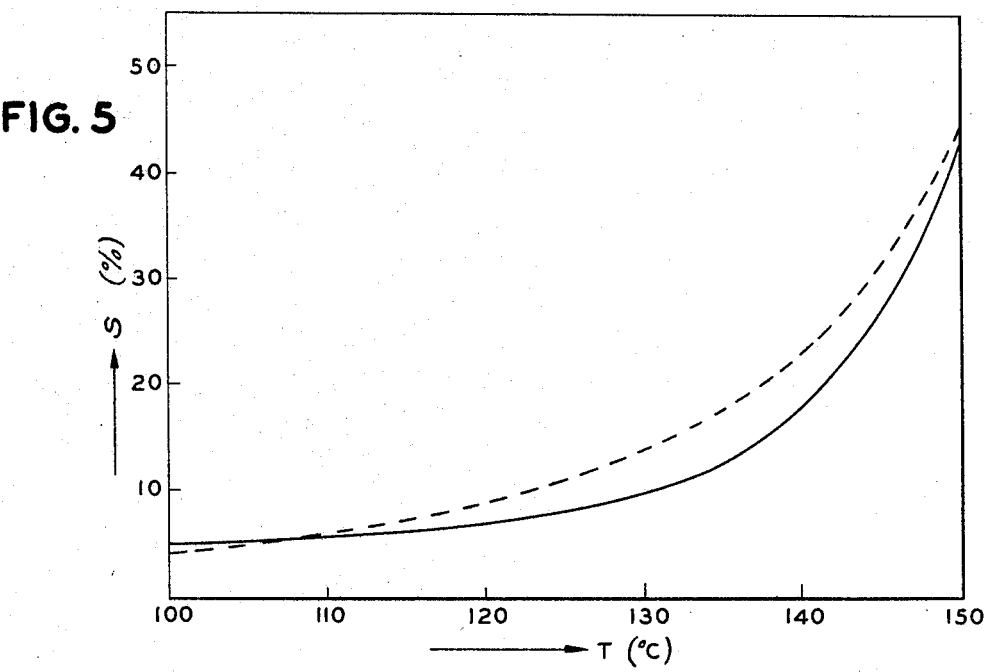

Stretching was performed in the machine illustrated in FIGURES 4a and 4b of the drawings. The material to be stretched was a film of isotactic polypropylene, 220 mm. wide and 0.5 mm. thick, having an RSV value of 3.36 and a melt index $i_5$ of 10.3 g/10 mins. at 230° C. The entry speed of the driven steel rolls 2 and 4 was $v_1=$ 4 m./min. In the preheating zone 5 of length $s=3.22$ m., the film was preheated to $T_1=136°$ C. and then contacted with a roll 6 of 150 mm. diameter, having a surface temperature $T_2$ of about 145° C. The roll 6 was driven at a speed of 4.2 m./min., i.e., at a speed 5% greater than that of the rolls 2 and 4. Stretching was performed at a stretch ratio $\lambda_1'=5.9$. The two cooled rolls 7 and 9 of the discharge unit had a speed $v_2=23.5$ m./min. The clear, longitudinally stretched film had a thickness of 0.1 mm. and a width of 185 mm., corresponding to a transverse contraction of 16%. The longitudinally stretched film was then heated in the preheating zone 10 maintained at a temperature $T_3=160°$ C. and transversely stretched in the stretching zone 11 at a stretching ratio of $\lambda_q=9.8$, while maintaining in the stretching zone a temperature $T_4=156°$ C. The film was then cooled under tension to about 30° C. in zone 12 and reeled up on the reel 13. The film, biaxially stretched in the manner described, had a thickness of about 0.010 mm., was very clear and had a temperature-shrinkage capacity relationship as shown in the S/T (shrinkage/temperature) diagram in FIGURE 5 of the drawings, in which the solid line curve represents the shrinkage in the traveling or machine direction and the dashed line curve represents the shrinkage transversely of the traveling or machine direction.

*Measuring the shrinkage*

To measure the shrinkage, a square piece of film, 10 x 10 cm., was immersed in triglycol for 1 minute at the desired temperature, then washed with water and the shrinkage in percent in the longitudinal and the transverse directions was measured.

It will be obvious to those skilled in the art that many modifications may be made within the scope of the present invention without departing from the spirit thereof, and the invention includes all such modifications.

What is claimed is:

1. A process for the manufacture of shrinkable polypropylene films which comprises extruding predominately isotactic polypropylene at a temperature in the range of about 190 to 325° C. through a sheet die having a width such as to give the resulting film a thickness greater than 0.3 mm., quenching the extruded melt at a temperature below 90° C., pre-heating the film for longitudinal stretching to a temperature in the range of $(T_1-5°$ C.) to $T_1$ ($T_1=130$ to 140° C.), further heating the film in contact with a roll manitained at a temperature $T_2$ ($T_2=140$ to 150° C.), stretching the film to 5 to 7 times its original length, cooling the film, heating the film to a temperature in the range of ($T_3-5°$ C.) to $T_3$ ($T_3=155$ to 165° C.), and stretching the film to 8 to 13 times its width at an ambient temperature of $T_4$($T_4=150$ to 160° C.), where $T_1<T_2<T_4<T_3$.

2. A process according to claim 1 in which $T_1$ is in the range of 135 to 137° C., $T_2$ is in the range of 145 to 147° C., $T_3$ is in the range of 158 to 162° C., and $T_4$ is in the range of 156 to 160° C.

3. A process according to claim 1 in which the quotient of the length in meters of a zone in which the pre-heating is effected divided by the product of the film speed in meters per minute and the film thickness in millimeters is not below 0.5.

4. A process according to claim 1 in which the polypropylene has a melt index, measured at 230° C., of 3 to 15 g./10 mins., and an RSV value greater than 2.

5. A process according to claim 1 in which the film is cooled after longitudinal stretching by contact with a cool roll.

6. The product of the process of claim 1.

References Cited

FOREIGN PATENTS

| | | |
|---|---|---|
| 871,183 | 6/1961 | Great Britain. |
| 892,006 | 3/1962 | Great Britain. |
| 915,694 | 1/1963 | Great Britain. |
| 918,497 | 2/1963 | Great Britain. |
| 671,029 | 9/1963 | Canada. |

ALEXANDER H. BRODMERKEL, *Primary Examiner.*

ROBERT F. WHITE, *Examiner.*

F. S. WHISENHUNT, A. H. KOECKERT,
*Assistant Examiners.*